E. H. THOMPSON.

Assignor to W. A. AMBERG.

Temporary Binder.

No. 8,072. Reissued Feb. 5, 1878.

Witnesses

Pennington & Calsted

Geo T. Smallwood Jr.

Inventor:

Edward H. Thompson.

By John J. Halsted.

his Atty.

N. PETERS, PHOTO-LITHOGRAPHER, WASHINGTON, D. C.

UNITED STATES PATENT OFFICE.

EDWARD H. THOMPSON, OF STARKE, FLORIDA, ASSIGNOR TO WILLIAM A. AMBERG.

IMPROVEMENT IN TEMPORARY BINDERS.

Specification forming part of Letters Patent No. 118,757, dated September 5, 1871; Reissue No. 8,072, dated February 5, 1878; application filed October 20, 1877.

*To all whom it may concern:*

Be it known that I, EDWARD H. THOMPSON, formerly of Washington, District of Columbia, now of Starke, Bradford county, Florida, have invented certain new and useful Improvements in Paper-Files; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
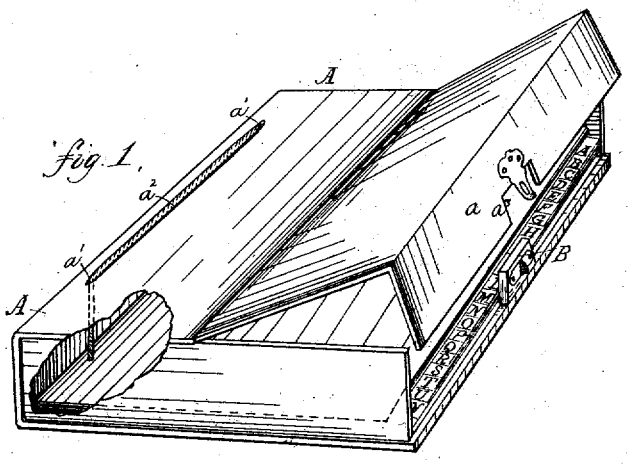
Figure 2:
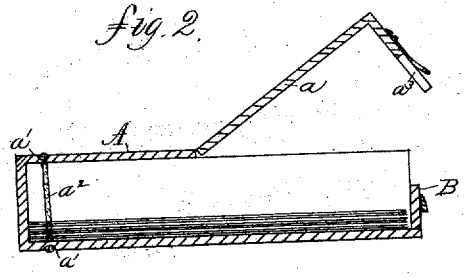

Figure 1 is a perspective view, and Fig. 2 a vertical cross-section.

This invention has reference to an improved file and index for letters, &c.; and it consists of a receptacle having near its rear end or back flexible or other suitable material for holding the index-leaves properly in place within said receptacle, whereby the said leaves may be arranged, with reference to each other, so that one or more may freely rise or fall on the holding-cord or other suitable material, so that a space of any required size can be created between them for the proper accommodation of the quantity of letters, &c., to be inserted between them for filling the said receptacle or case, the receptacle or case being furnished with a hinged door or lid and a post or guard to assist in properly retaining the letters, &c., within the leaves of the index, substantially as hereinafter more fully described and claimed.

To enable others to manufacture and use my invention, I proceed to describe it.

In the annexed drawings, A refers to a receptacle or case, made preferably of a rectangular form, and supplied with a door or lid, *a*, which is hinged or attached to the said case in any suitable manner, and is provided at the front with a clasp, which connects with a guard, B, secured to the base or bottom of the case A. The case A is provided with openings $a^1$ $a^1$, both at its top and bottom, near its rear or back, for holding the tape $a^2$, or with other suitable means for holding the index-leaves, which index-leaves are designated by letters of the alphabet, as shown, and are held within said case by the said fastening or tape $a^2$ being made to pass through holes or apertures made in said index-leaves near their backs, whereby the said leaves are secured in place, so that they may rise or fall on their fastening, so as to permit of a space being created between them of such size as to accommodate or suit the quantity of letters to be inserted between them in filing.

B refers to a guard or post attached to the bottom of the case at its front. As shown, the lid is cut away so as to pass around this guard or post. Said guard forms a part of the lid or cover clasp, and it prevents the letters inserted between the index-leaves from projecting beyond the same, so as to interfere with the operation of the lid or cover.

The operation will be readily understood from the construction.

Having thus described my invention, what I claim as new is—

1. The case A, having a lid or cover, *a*, and the guard or post B, in combination with index-leaves arranged to receive letters loosely between them, substantially as set forth.

2. The case A, lid or cover *a*, and guard B, in combination with the binding $a^2$ and the index-leaves, substantially as specified.

3. The index-leaves perforated at their backs, to rise and fall on the binding and keep them in place, in combination with the binding and with the case A, forming a guide for the insertion of the letters, and holding them in place, substantially as shown and described.

In testimony that I claim the foregoing I have hereunto set my hand this 8th day of October, 1877.

EDWARD H. THOMPSON.

Witnesses:

JOHN DRIGGERS,

GEORGE WILEY.